A. H. WOUTERS.
HIGH SPEED DYNAMO ELECTRIC MACHINE.
APPLICATION FILED NOV. 3, 1906.
925,976.
Patented June 22, 1909.
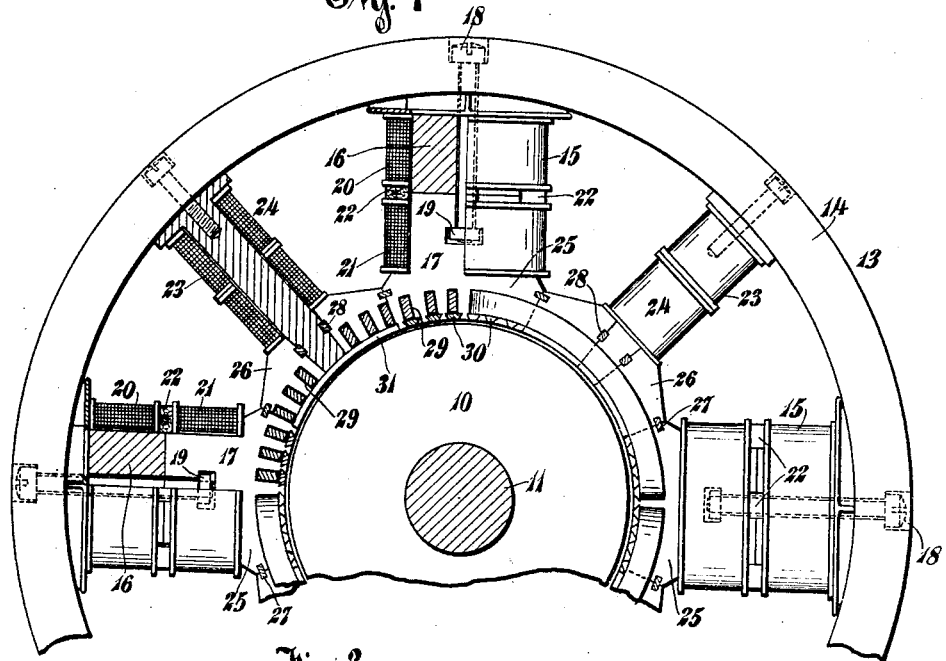
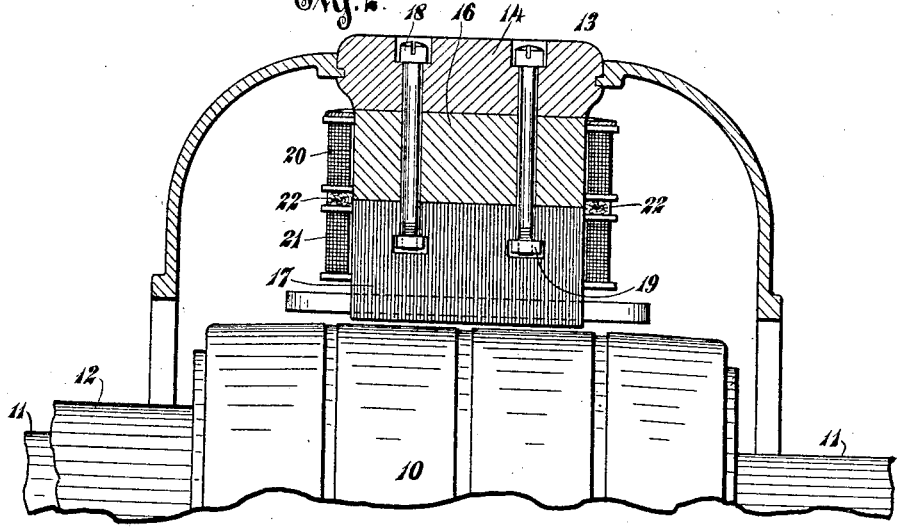

UNITED STATES PATENT OFFICE.

ALFRED H. WOUTERS, OF NORWOOD, OHIO, ASSIGNOR TO ALLIS-CHALMERS COMPANY, A CORPORATION OF NEW JERSEY, AND THE BULLOCK ELECTRIC MANUFACTURING COMPANY, A CORPORATION OF OHIO.

HIGH-SPEED DYNAMO-ELECTRIC MACHINE.

No. 925,976.   Specification of Letters Patent.   Patented June 22, 1909.

Application filed November 3, 1906. Serial No. 341,814.

*To all whom it may concern:*

Be it known that I, ALFRED H. WOUTERS, belonging to the Kingdom of the Netherlands, residing at Norwood, in the county of Hamilton and State of Ohio, have invented certain new and useful Improvements in High-Speed Dynamo-Electric Machines, of which the following is a full, clear, and exact specification.

My invention relates to dynamo-electric machines and particularly to high speed direct current machines, such as direct current turbo-generators.

In some types of machines particularly high speed machines, it is necessary to provide auxiliary field windings to improve commutation. These windings are generally arranged on auxiliary poles midway between the main poles so as to provide commutating fields for the short-circuited coils, or are distributed in slots adjacent the armature so as to balance the armature reaction. Either or both arrangements may be employed as conditions of design, use, and mode of operation require. The coils of the distributed auxiliary winding are sometimes arranged in slots in the inner ends of the field poles only, or non-magnetic bridging members may be provided between the poles, and the windings arranged in slots in said non-magnetic bridging members as well as in the ends of the field poles. With either arrangement, to assemble, connect and secure the coils of the distributed winding in position requires the expenditure of considerable time and labor. It is therefore highly desirable that the coils never be disturbed or removed unless it is absolutely necessary to do so. However, it frequently happens that the main field windings must be removed or replaced as is the case when a coil is burned out or otherwise injured. In the machines as heretofore constructed having a distributed auxiliary field winding it has been necessary to remove a section of the auxiliary field winding to remove a main field coil.

The object of my invention is to provide means whereby a field coil can be removed from a field pole without rendering necessary a removal of the auxiliary winding or a portion of the same, or without otherwise disturbing said winding.

In carrying out my invention, I provide a dynamo-electric machine with main and auxiliary field windings, the parts being so constructed that the main field winding is removable without disturbing the auxiliary field winding.

More specifically considered, my invention consists in a dynamo-electric machine having field poles carrying main field coils, the poles and coils being divided into sections, bridging members between the field poles and a distributed auxiliary field winding carried by the inner ends of the poles and the bridging members, the parts being so arranged and constructed that the outer sections of the poles and of the main field coils can be removed without disturbing the inner sections of the poles, the bridging members, and the auxiliary field winding carried thereby.

My invention still further consists in certain novel combinations and arrangements of parts described in the specification and set forth in the appended claims.

For a better understanding of my invention, reference is had to the accompanying drawings in which Figure 1 is a partial end elevation of a machine equipped with my invention, parts being in section; and Fig. 2 is a partial longitudinal section, the section being taken approximately through the center of one of the main field poles.

Referring now to the figures of the drawing, 10 represents an armature of a machine equipped with my invention, which armature is mounted on a shaft 11, adjacent the commutator 12. The armature forms no part of my present invention and is accordingly shown merely in outline. Surrounding the armature is a stationary field member 13. The field member comprises a yoke 14 having at each side an end housing. Extending inwardly from the field yoke and removably secured thereto are a plurality of main field poles 15, in this case four in number. Each field pole consists of two main sections, the outer section 16 of which is solid, in this instance, and the inner section 17 of which is laminated. The two sections of each pole are held to the frame by bolts 18 which pass entirely through the solid section 17 and engage nuts 19 embedded in the inner laminated section. The main field winding is mounted on the field poles, the winding on each pole consisting of two coils 20 and 21. The two coils are in this case spaced apart by blocks or strips 22, the line of division between the sections of the pole occurring between the two coils on the pole. I have in this instance shown concentrated auxiliary field windings for producing a commutating field and also distributed auxiliary windings for balancing or neutralizing the armature reaction but the former may if desired be omitted without affecting my invention. The concentrated auxiliary windings are shown at 23 mounted on auxiliary field poles 24 midway between the main field poles.

Located between the ends or shoes 25 of the poles 15 and the lower ends of the auxiliary poles 24 are bridging pieces 26 of non-magnetic material which are preferably fastened to the poles by wedges or rods 27 and 28. It is seen that between each pair of main pole shoes there is a continuous metallic bridge. In case the auxiliary windings 23 and poles 24 are dispensed with, the non-magnetic bridging members extend from pole to pole. The main pole shoes 25 and bridging members 26 are provided with slots adjacent the air gap of the machine. Located in the slots are the conductors of the distributed auxiliary winding 29. In this case, the coils of this winding are arranged in groups, each group consisting of concentric coils carried by a pair of adjacent poles and the intermediate non-magnetic bridging members. Preferably the coils are held in the slots in the pole-shoes by wedges 30 of non-magnetic material and in the slots of the non-magnetic bridging members 26 by strips 31 which may be screwed to the bridging members. Now, in case it is desired to remove one of the field coils it is unnecessary to remove a section of the distributed balancing winding as in the previous constructions. All that is necessary is to remove the bolts 18 which secure the field pole to the yoke. When the bolts are removed the outer secton 16 of the pole and the coil 20 of the main field winding can be removed leaving the inner end of the pole and the inner coil 21, which are supported by the bridging members. In case it is desired to remove the inner coil 21, the latter can be slid outward off the inner section of the pole.

If desired the inner end of the pole may be supported by other means in addition to the bridging members, when the outer end of the pole is removed, especially when the inner ends of the poles are very heavy.

I do not wish to be confined to the exact details shown but aim in my claims to cover all modifications which do not involve a departure from the spirit and scope of my invention.

What I claim as new and desire to secure by Letters Patent is:—

1. In a dynamo-electric machine, a field yoke, separable field poles, means for fastening said poles to said yoke, main field coils on said poles, distributed auxiliary field coils on the inner ends of said poles, and additional means for supporting said auxiliary coils when said pole fastening means are removed, whereby the removal of said main field coils without disturbing the auxiliary field coils and without changing the position of the field yoke or any part of same is permitted.

2. In a dynamo-electric machine, a field frame, field poles, main and auxiliary field windings, the auxiliary field winding being a distributed one mounted upon the inner ends of the poles, said poles being divided transversely into relatively removable sections, means for fastening said pole sections to said field frame, and additional means for supporting the inner sections of said poles, whereby the outer sections and main field winding may be removed without disturbing the inner sections and the auxiliary field winding carried thereby.

3. In a dynamo-electric machine, an armature, a field frame, field poles secured thereto, main and auxiliary field windings carried by said field poles, the auxiliary winding being distributed around the space in which the armature rotates and located at the inner ends of the poles, each of said poles consisting of two parts or sections, the parts or sections being removable from each other and from the frame, means for fastening said sections to said frame, and additional means for supporting the inner sections of the poles independently of the outer sections when the latter sections are removed.

4. In a dynamo-electric machine, a field frame, field poles secured thereto, main field coils carried thereby, each pole and the field coils surrounding same being divided into sections in planes perpendicular to the pole axis, means for fastening said pole sections to said frame, rigid bridging members between the poles, and an auxiliary distributed field winding carried by the inner sections of the poles and by the bridging members, the bridging members bracing and supporting the inner sections to permit an outer field pole section and a main field coil to be removed from the field frame without disturbing the auxiliary winding.

5. In a dynamo-electric machine, a field frame, main field poles and commutating field poles carried thereby, non-magnetic bridging members between the inner ends of the main field poles and the commutating field poles and fastened thereto, a distributed auxiliary winding carried by the main field poles and said bridging members, said main field poles being divided transversely into relatively removable sections, and sub-divided main field coils carried by said main field poles, the structure being such that the main field coils and sections of the main field poles may be removed from the machine without disturbing the distributed auxiliary winding or the field frame.

6. In a dynamo-electric machine, a field frame, main field poles mounted therein, a distributed auxiliary winding mounted in slots in the faces of the main field poles, said main field poles being divided transversely into relatively removable sections, coils on said main field poles, commutating field poles also mounted in said field frame, and means for fastening the inner sections of said main field poles to the commutating field poles so that the distributed auxiliary winding may be held rigidly in position by the commutating field poles when the main field coils and sections of the main field poles are removed from the machine.

In testimony whereof I affix my signature, in the presence of two witnesses.

ALFRED H. WOUTERS.

Witnesses:
ARTHUR F. KWIS,
GEO. B. SCHLEY.